US 11,196,963 B1

(12) United States Patent
DiPasquale et al.

(10) Patent No.: US 11,196,963 B1
(45) Date of Patent: Dec. 7, 2021

(54) PROGRAMMABLE VIDEO COMPOSITION LAYOUT

(71) Applicant: Amazon Technologies, Inc., Seattle, WA (US)

(72) Inventors: Tobias DiPasquale, King of Prussia, PA (US); Siddhartha Shankara Rao, Seattle, WA (US); John Joseph Dunne, Bremertom, WA (US); Ivan Marcin, Palo Alto, CA (US); Richard Newman, Pullman, WA (US); Eric D. Cox, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/118,080

(22) Filed: Dec. 10, 2020

(51) Int. Cl.
*H04N 7/15* (2006.01)
*G06F 3/0484* (2013.01)
*H04L 29/06* (2006.01)

(52) U.S. Cl.
CPC ........... *H04N 7/152* (2013.01); *G06F 3/0484* (2013.01); *H04L 65/4046* (2013.01)

(58) Field of Classification Search
CPC .. H04N 7/15; H04N 7/14; H04L 29/06; G06F 3/0484

USPC ............................................ 348/14.01–14.16
See application file for complete search history.

(56) References Cited

U.S. PATENT DOCUMENTS

| | | | | |
|---|---|---|---|---|
| 10,182,204 | B1* | 1/2019 | Taine | H04N 7/147 |
| 2006/0098086 | A1* | 5/2006 | Chandra | H04N 7/15 348/14.07 |
| 2012/0026278 | A1* | 2/2012 | Goodman | H04N 7/15 348/14.08 |
| 2012/0062689 | A1* | 3/2012 | Sai | H04N 7/15 348/14.09 |
| 2015/0109405 | A1* | 4/2015 | Skramstad | H04N 5/265 348/14.08 |
| 2017/0052757 | A1* | 2/2017 | Kanda | G09G 5/14 |
| 2019/0342519 | A1* | 11/2019 | Van Os | H04L 51/04 |

* cited by examiner

*Primary Examiner* — Melur Ramakrishnaiah
(74) *Attorney, Agent, or Firm* — BakerHostetler

(57) ABSTRACT

Implementations for combining a plurality of content based on instructions for a layout of a video conference are described. A video conference is established between a plurality of devices of participants of the video conference. First content is received from a device of the plurality of devices in the established video conference. Second content is also received. Instructions for a layout of the first content and the second content during the video conference is received. Based on the instructions for the layout, the first content and the second content are combined into a composite video stream. The composite video stream is saved or transmitted.

22 Claims, 9 Drawing Sheets

PROGRAMMABLE VIDEO COMPOSITION LAYOUT

BACKGROUND

Currently many meetings are held that involve multiple participants at multiple locations. Thus, such meetings are often handled electronically and may be in the form of video conferencing among the multiple participants. The video conferences are generally hosted by one or more hosting servers with which the multiple participants communicate over a network, such as, for example, the Internet. The multiple participants generally communicate with the hosting servers using electronic devices such as, for example, smart phones, tablets, computers, etc. Traditionally, the video feeds from all of the participants are individually sent to the device of each participant according to a preset layout selected by the meeting service. However, an organizer of a video conference may desire to control the layout of the video conference according to different parameters.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

Figure 1:
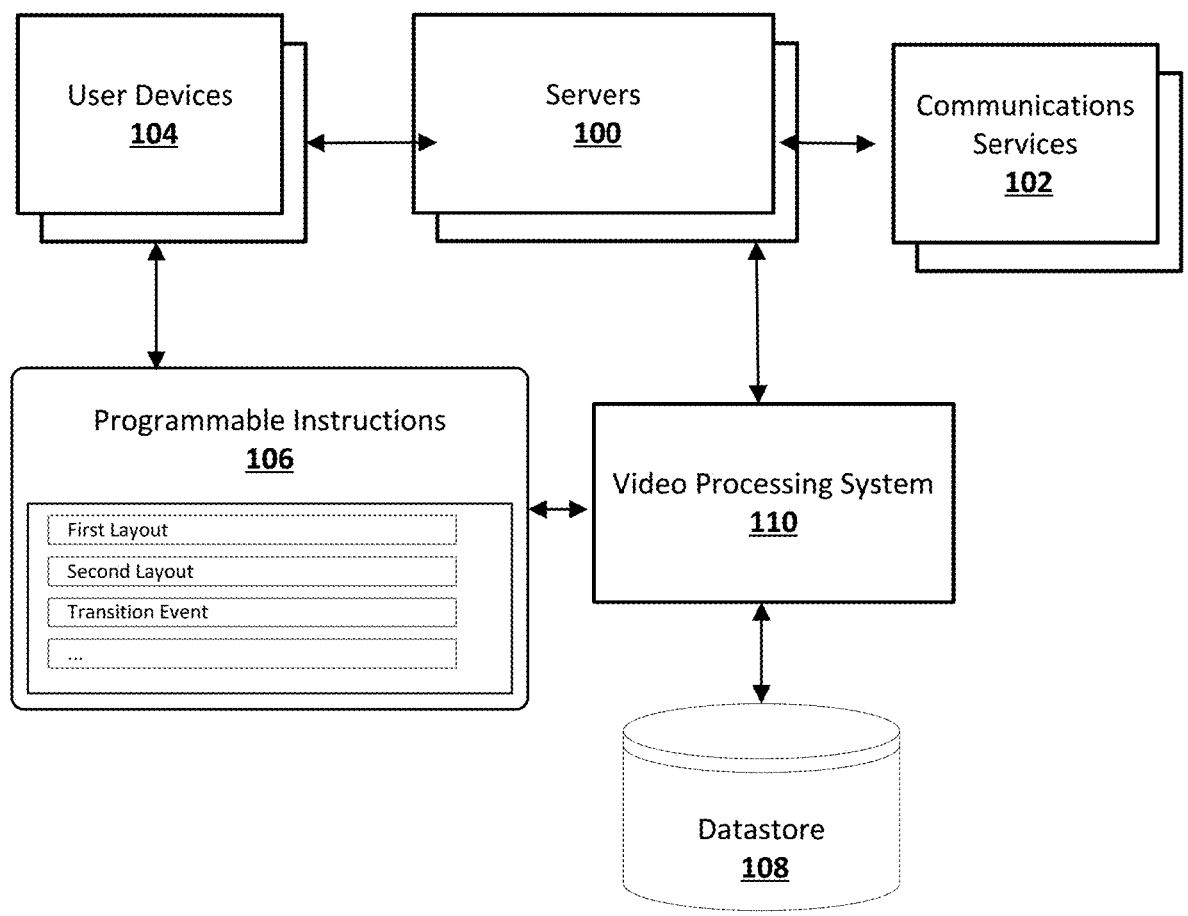
FIG. 1 schematically illustrates a high-level architecture of a video processing system in a media conferencing framework.

This disclosure describes techniques and architecture for outputting a media conference, such as a video conference, according to instructions for one or more graphical layouts. The instructions can be code, such as JavaScript code, Hypertext Markup Language (HTML), Extensible Markup Language (XML), WebAssembly (Wasm), or the like. The instructions can be received from an organizer, an agent of an organization, or another participant of the media conference. The instructions can also be a selection of one or more preset graphical layouts presented to the organizer or the other participant of the video conference for selection. The instructions can also include a combination of custom graphic layouts and selection of one or more preset graphical layouts. The instructions can be received in advance of the media conference, and can be included in the request for establishing the media conference.

Traditionally, the layout of a media conference is not determined by the media conferencing service, but is determined by a participant node. For example, each participant in a group video chat can be assigned a tile in a participant matrix by the participant node. The video stream for each participant will be output at the location of the assigned tile. Thus, traditionally the organizer, agent, or other participant of the media conference cannot customize the layout of the media conference during or in advance of the start of the media conference. In addition, the organizer, agent, or other participant of the media conference cannot customize the transition of the layout of the media conference from a first layout to a second layout based on a predetermined event, such as a predetermined time. For example, the organizer, agent, or other participant of the media conference cannot request a customized a first layout when a presentation is shared in the media conference, or transition to another customized layout automatically after the presentation is completed for questions. In another example, the organizer, agent, or other participant of the media conference cannot create a custom lobby for the participants to start the media conference that is followed by a preset graphical layout upon a predetermined event.

An organizer, agent, or other participant of the media conference can, for example, provide a package of code that specifies layouts of a media conference for different events within the media conference in advance of the start of the media conference. For example, a first layout can be specified for an introduction portion of the media conference, a second layout can be specified for a presentation portion of the media conference, and a third layout can be specified for a question and answer portion of the media conference. The first, second, or third layout can each be a custom layout or be a selection of preset graphical layout. The package of code can also specify the events that cause the transition between different layouts. For example, a transition event can be the sharing of a presentation, an absolute time during the day, or a relative time from the start of the media conference. For example, if a presentation is scheduled for twenty minutes, the layout may be switched from a presentation layout to a question and answer layout following twenty minutes.

In other examples, the transition can be a state change, such as joining of a new participant, departure of a participant, sharing of new content, start of speaking by another participant, unmuting of a microphone, turning a camera on or off, when an organizer or presenter arrives, when there is a participant that is external to the organization, when the number of participants is above a threshold, when the number of participants is below a threshold, or the like. In such a transition, the tile that is the largest, or the tile that is centered, can be changed to be associated with a different participant. The transition can be a change in video quality, such as a change in frame rate or resolution below a threshold. The transition can be a change in network quality, such as an increase in latency, jitter, an increase in dropped packets, IP transmission synchronization, or the like. In such a transition, a tile associated with the participant having the low quality video or reduce network quality can be transitioned to be associated with another participant having high quality video or constant network quality. The transition can be an action by a participant, such as a new device being plugged into a participant node. The transition can be an error state, such as failure at a participant node, failure at a media conferencing service, failure at a hosting server, or the like. Yet further, the transition can be a content-based transition that is based on the content of the media. For example, a transition can be based on whether a face becomes present or leaves a frame.

The layout instructions can inject any content into the media conference. For example, in addition to video streams of the participants of the media conference or a presentation shared by a presenter, the layout instructions can specify an image file, a video file, a video stream, a game stream, a webpage, an application graphical user interface, a video of a screen, a text feed, an RSS feed, augmented reality, virtual reality, spatial audio, multichannel audio, or the like to be inserted into the media conference. For example, an RSS feed can be scrolled along a bottom of the media conference, a video can be inserted in a corner of the media conference during a predetermined portion of the media conference, or a website can be inserted during another predetermined portion of the media conference. These layouts can be custom layouts designed by the organizer or the other participant(s) of the media conference, or they can be selected from preset layouts suggested by the media conferencing service. For example, the media conferencing service can present a graphical user interface including a plurality of preset layouts for selection by the organizer or the other participant(s) of the media conference.

Following the start of the media conference, the media conferencing service uses the layout instructions and the content to be included in the media conference to create a composite video stream of the media conference. In other words, the media conferencing service combines the content to be simultaneously displayed according to the layout instructions into a single video stream to be sent to some or all of the participants of the media conference. Based on the layout instructions, the content that is combined into the single video stream may change according to predefined events, such as at different times. Sending a composite video as opposed to the individual video streams reduces the hardware resources, software resources, and/or network bandwidth required to output the media conference on the device of a participant. For example, the processing resources required to decode a single, combined video stream are lower than the processing resources required to simultaneously decode a plurality of video streams. In addition, the single, combined video stream may be encoded at a particular size, resolution, frame rate, or encoding standard ("codec") that can be decoded by the software on the device and that requires less bandwidth for transmission and reception. In some embodiments, the instructions for creating the composite video stream can be included with the layout instructions. For example, the layout instructions can specify the size, resolution, frame rate, and/or the encoding standard for creating the composite video stream.

Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

FIG. 1 illustrates a high-level architecture of a video processing system in a media conferencing framework, according to an embodiment. One or more servers 100 may serve as a frontend to one or more communication services 102 for various user devices 104. The communication services can be, for example, audio conferencing, video conferencing, chatting, and gaming services. Note that, while communication services 102 are shown outside servers 100 in FIG. 1, one or more of communication services 102 may be implemented on one or more of the servers 100.

In the example of a multi-party video conference, at least some of the user devices 104 may have cameras capturing the participant, such as a headshot of the participant, and/or at least some of the user devices 104 may capture content being displayed on the user devices 104, i.e., screen shots. In yet other examples, content, such as pre-recorded or live videos, can be injected into the video conference by a user device 104 or by the communication services 102. In still other examples, an application running a file, such as a presentation, on the user device 104 can be injected into the video conference. These content items may be sent to the media conferencing service 102 for combining into a composite video stream that is transmitted to some or all of the user devices 104 of the video conference.

The layouts of the composite video stream may be received from the organizer and/or the other participant of the media conference in programmable instructions 106 that define one or more layouts, such as a first layout and a second layout, as well as transition events to cause transition between the different layouts. In some embodiments, the programmable instructions 106 may include different layouts that may be simultaneously displayed to different user devices 104 depending on the type of user device 104. For example, a first layout may be specified for a user device 104 having a small display size, such as a smart phone, while a second layout may be specified for a user device 104 having a relatively large display size, such as a desktop computer or a television. In yet another example, the programmable instructions 106 may include different layouts that may be simultaneously displayed to different user devices 104 depending on the type of network connection between the user devices 104 and the servers 100. For example, a first layout may be specified for an unmetered or relatively high speed network connection, such as an enterprise connection, while a second layout may be specified for a metered, or relatively low speed network connection, such as a mobile connection. The programmable instructions 106 may be expressed in a declarative format that allows the layout to be defined without injecting code into the media conference. In one specific example, the layout may be expressed using a language-independent data format, such as JavaScript Object Notation (JSON), Hypertext Markup Language (HTML), Extensible Markup Language (XML), WebAssembly (Wasm), or the like. In some examples, various virtual surfaces may be defined in the layout and each virtual surface may be associated with a unique name and may include identifications of one or more display items, such as widgets (e.g., text, images, video, graphics, animations, input controls, etc.), to include in the layout and one or more properties (e.g., size, position, color, visibility, etc.) of each of one or more content items. The programmable instructions 106 can include identifiers of one or more preset layout provided by the media conferencing service, as described in greater detail below. The programmable instructions 106 can also specify a particular size, a particular resolution, a particular frame rate, and/or a particular color profile to be used for the composite video stream. In some examples, the composite video stream may be up-sampled to a higher resolution to match a standard resolution, such as 4K resolution, and/or the frame rate of the composite video can be increased. The programmable instructions 106 can also enable animations, styling, and alpha blending of the elements being combined into a composite video stream. For example, the programmable instructions 106 can include a background blur, face swaps, face mutation/augmentation, insertion of objections, augmented reality, or the like.

The programmable instructions 106 may express a position of a content item based on relative amounts of positional attributes that are relative to total amounts of the positional attributes for the layout as a whole. In some examples, the position attributes may include an X-dimension (or width) and/or a Y-dimension (or height) in an XY coordinate system. Also, in some examples, the relative amounts may be expressed as mathematical functions with respect to the total amounts, such as percentages, ratios, or fractions of the total amounts. For example, a position of a content item may be expressed using a percentage (or other relative amount) of a total width and/or a total height of a layout that includes the content item. In one specific example, a coordinate system may originate from a top left corner of a layout. In this example, to display a content item halfway down the left edge of the layout, the position of the content item may be expressed as (0.0w)×(0.5h). In this case, the (0.0w) refers to zero width (corresponding to the left edge of the layout), and the (0.5h) refers to half of the height (corresponding to halfway down the layout). As another example, to display a content item halfway down the right edge of the layout, the position of the content item may be expressed as (1.0w)×(0.5h). In this case, the (1.0w) refers to the total width (corresponding to the right edge of the layout), and the (0.5h) refers to half of the height (corresponding to halfway down the layout).

A video processing system 110 may create the one or more composite video stream based on the programmable instructions 106 and the various content received from the user devices 104 and/or other content sources, such as websites or RSS feeds, for example. The video processing system 110 may also retrieve content from third-party sources identified in the programmable instructions 106. For example, the programmable instructions 106 may include one or more links to a video file, an audio file, an RSS feed, a text feed, augmented reality, virtual reality, spatial audio, multichannel audio, or other content. The video processing system 110 can retrieve the content from the one or more links to combine with the video streams received from the user devices 104 to create the composite video stream. This additional third-party content may be interactive content that allows a participant to provide input, such as to provide feedback, to purchase various products or services, or to provide other types of input. In some cases, this additional content may include text, images, video, graphics, animations, input controls (e.g., buttons, checkboxes, etc.), and the like. Also, in some cases, the additional content may include statistics, inventory, location information, timing information, and other statistics. If the programmable instructions 106 include different layouts for different user devices, the video processing system 110 can simultaneously create different composite video streams that are transmitted to different user devices 104.

The video processing system 110 may store the programmable instructions 106 for different media conferences and/or user preferences for display of the media conference for each user device 104 within a datastore 108. For example, an organization can provide different programmable instructions 106 for different types of media conferences. For example, a keynote presentation can include a particular layout, while a town hall can include another particular layout. As such, multiple programmable instructions 106 for multiple media conferences can be stored in the datastore 108. Different programmable instructions 106 can be stored for organizations, organizers, and/or participants of the media conferencing service in the datastore 108. The datastore 108 may be implemented as one or more databases stored on one or more data storage devices and/or data storage systems. Note that, in embodiments, the servers 100 and/or the data storage devices or systems may be distributed across two or more data centers.

In an embodiment, components of the video processing system 110 may be implemented on one or more backend servers in the context of the Web services framework. Note, however, that one or more components of video processing system 110 may be implemented on one or more of the Web services frontend servers 100. However, one or more backend servers (in the context of the Web services framework) that each implement one or more instances of one or more components of the video processing system 110 may be considered frontend servers of the video processing system 110 itself, while one or more instances of one or more other components of the video processing system 110 may be implemented on backend servers in the context of the video processing system 110. In embodiments, some aspects of the video processing system 110 can be implemented on the user devices 104, such as any interactive components of the media conference or features that are going to be overlaid in the user devices, such as objects overlaid on the composite video.

Embodiments of the video processing system 110 as described herein may be implemented according to an architecture that is linearly scalable. Embodiments may be scaled quickly and easily with little or no risk of losing encoding preferences and requirements, with minimum or no downtime, and without affecting the latency of the overall system. Servers 100 may be added as needed to support additional processing as needed by the video processing system 110 to combine a greater amount of content in a single video stream, or to support a greater number of media conferences simultaneously.

Figure 2:
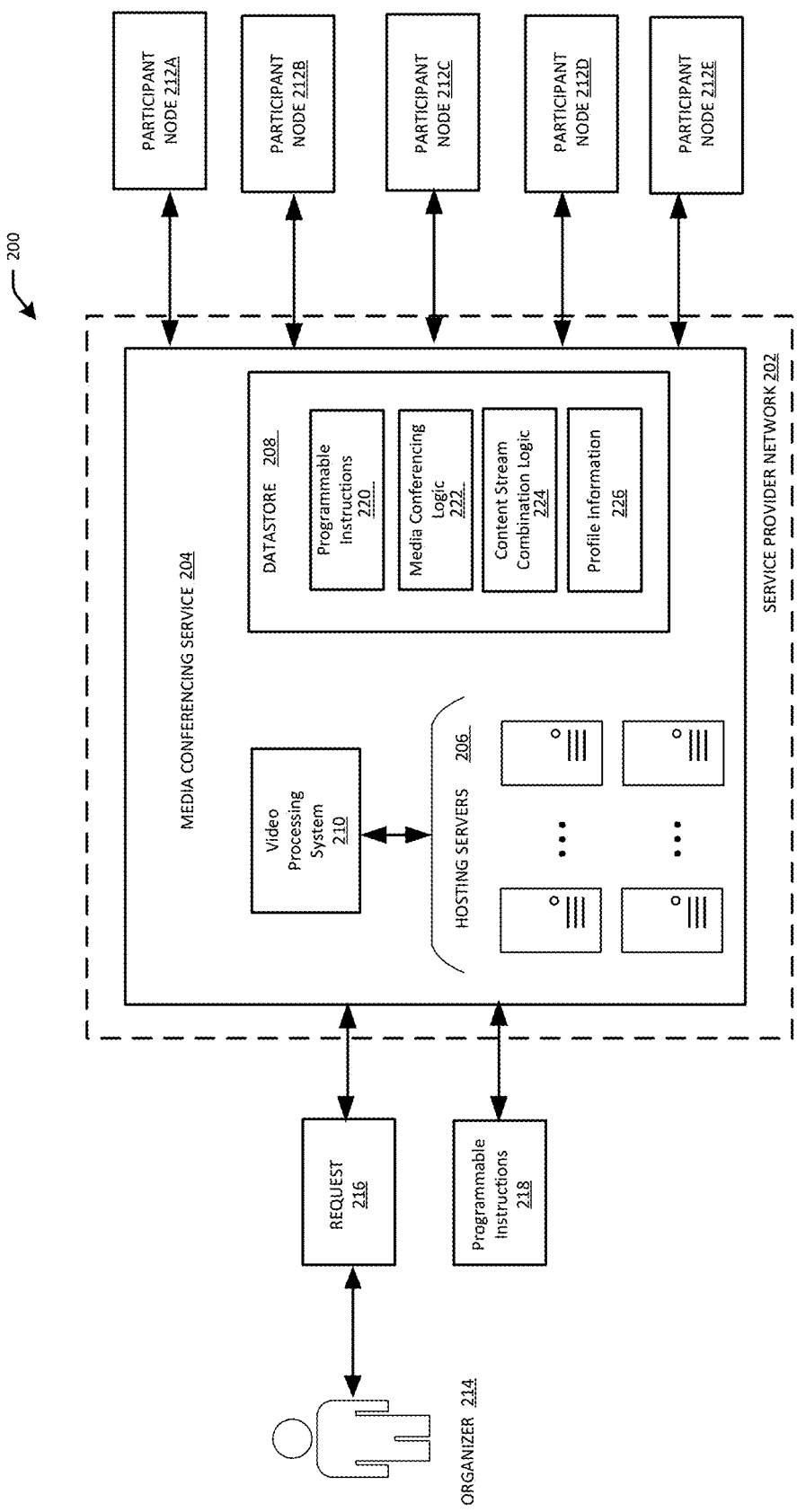
FIG. 2 schematically illustrates a system-architecture diagram of an example service provider network that provides a media conferencing service.

FIG. 2 schematically illustrates an example environment 200 that includes a service provider network 202. The service provider network 202 provides various services to users, such as participant nodes 212A-E, which can be the user devices 104. For example, the service provider network 202 can provide computing resources, like Virtual Machine (VM) instances and storage, on a permanent or an as-needed basis. In particular, the computing resources provided by the service provider network 202 can include various types of computing resources, such as data processing resources like VM instances, data storage resources, networking resources, data communication resources, network services, and the like. Common expressions associated with the service provider network may include, for example, "on-demand computing," "software as a service (SaaS)," "cloud services," "data centers," and so forth. Services provided by the service provider network 202 may be distributed across one or more physical or virtual devices.

In the example environment 200, the service provider network 202 includes a media conferencing service 204, such as a video conferencing service. The media conferencing service 204 may include multiple hosting servers 206. In some embodiments, the multiple hosting servers 206 may be the frontend servers 100 and located in multiple geographical locations. In some embodiments, the media conferencing service 204 also includes a datastore 208 and a video processing system 210. In some embodiments, the video processing system 210 may be the video processing system 110. The media conferencing service 204 may facilitate initiation of the media conference or may otherwise allow the media conference to take place via hosting server (or servers) 206.

Multiple participant nodes 212A-E are illustrated in the example environment 200. The participant nodes 212A-E represent participants, user devices, clients, bots, and/or users for media conferences provided by the media conferencing service 204. The media conferencing service 204 may be, for example, the communications services 102 of FIG. 1. The participant nodes 212A-E interact with the media conferencing service 204 and the hosting servers 206 via electronic devices such as, for example, smart phones, tablets, laptop computers, desktop computers, telephones, etc. In some embodiments, at least one of the participant nodes 212A-E may be a bot that is configured to interact in the video conference instead of a human participant. In configurations, the media conferences may comprise text, audio, and/or video, e.g., one or more of the participant nodes 212A-E may participate in a media conference that includes both audio and video. Text, audio, and/or video content can be sent between the participant nodes 212A-E via the media conferencing service 204. The media conference may be part of a gaming platform.

When one or more of the participant nodes 212A-E wish to participate in a media conference, an organizer 214 of the media conference may send a request 216 for the media conference to the media conferencing service 204. Programmable instructions 218 for the media conference may also be sent to the media conferencing service 204. The programmable instructions 218 may be sent by the organizer 214, an agent of an organization, or one or more of the participant nodes 212A-E. The programmable instructions 218 may be the programmable instructions 106 that specify one or more layouts of the media conference and one or more transition events to cause transition between different layouts. The organizer 214 may also be a participant in the media conference.

Information from the video processing system 210 can be sent to the datastore 208, or information can be sent from the datastore 208 to the video processing system 210. For example, the programmable instructions 220 of the datastore 208 can be the programmable instructions 106 or 218. Media conferencing logic 222 of the datastore 208 can include instructions for establishing and conducting multi-party media conferences, such as multi-party video conferences. Content stream combination logic 224 of the datastore 208 can include details of the various codecs used for combining and encoding various content, such as video streams. The content stream combination logic 224 can also include instructions for encoding the composite video stream at different sizes, resolutions, and frame rates. The profile information for each participant of the media conferencing service 204 can be saved in the profile information database 226. The profile information for each participant or organization can include an identifier of the participant, an identifier of the organization associated with the participant, participant demographic information such as gender, age, occupation, income, marital status, etc., and media conference preferences of the participant. The preferences of the participant or the organization can also include a geographic region in which to combine the individual video streams for security, cost, and/or performance reasons.

Figure 3A:
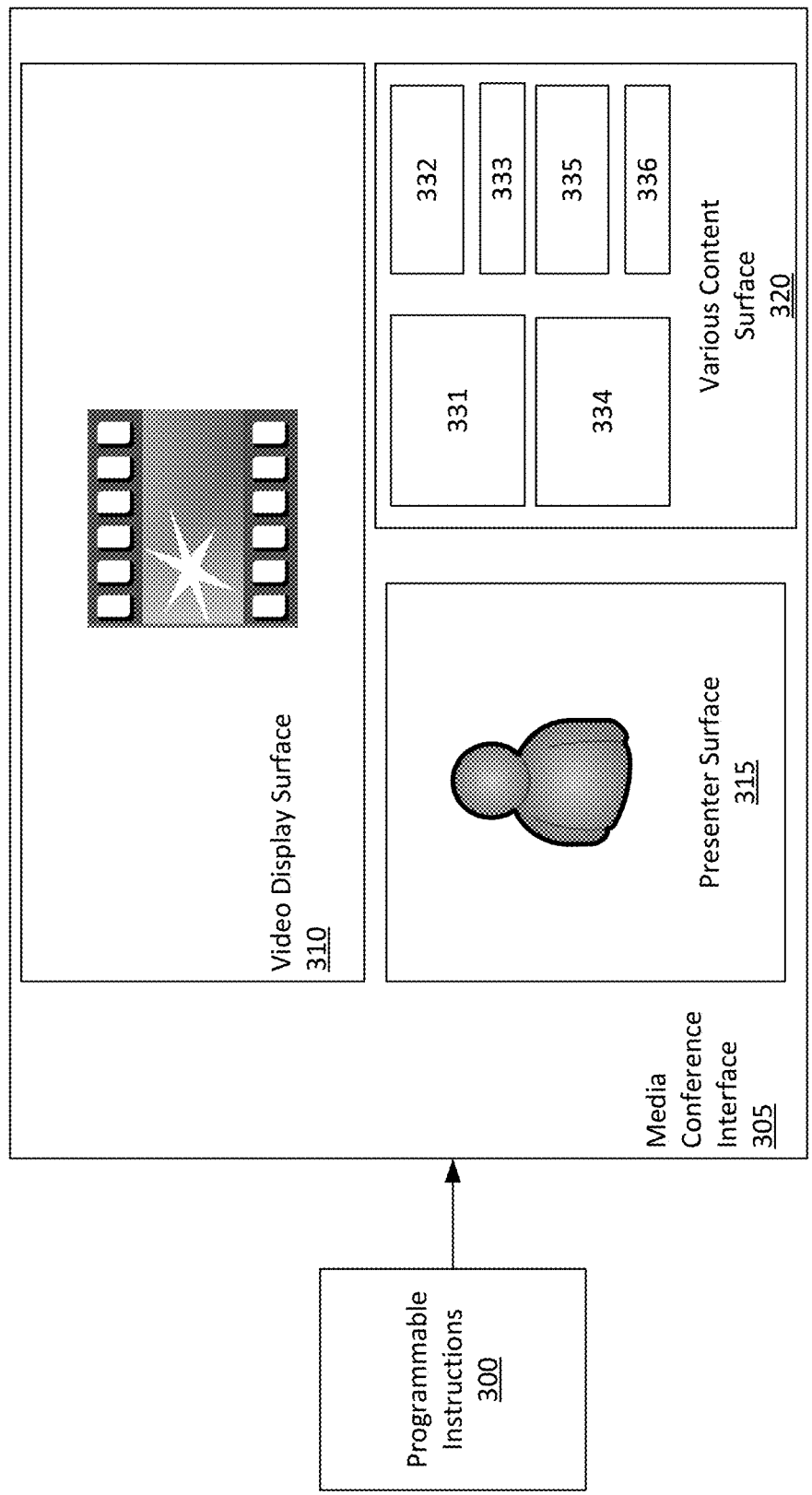
FIGS. 3A-B schematically illustrate various example layouts specified by programmable code combining multiple content to output a composite video stream.
Figure 3B:
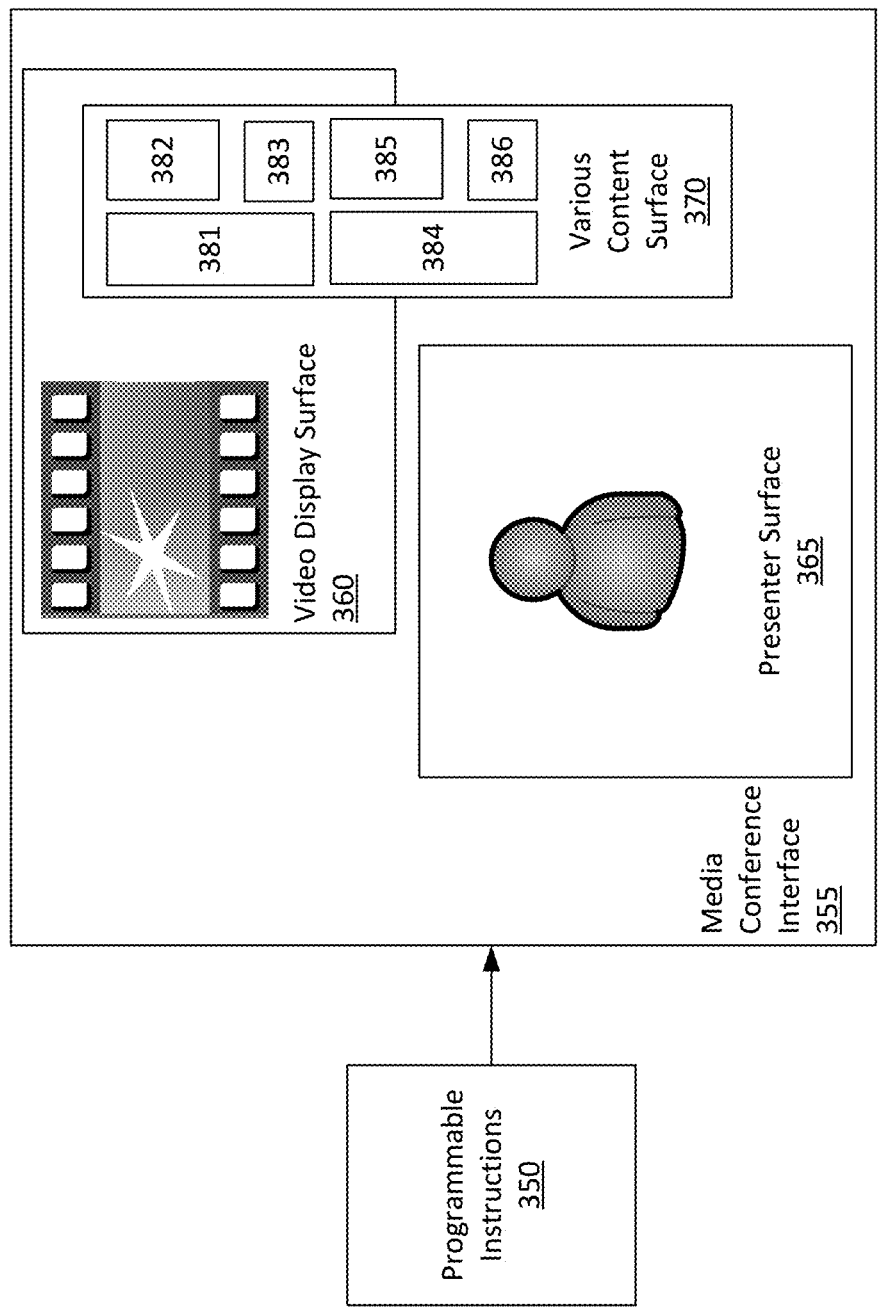

FIGS. 3A-B schematically illustrate example layouts specified by programmable code combining multiple content to output a composite video stream using the media conferencing service 204. For example, customized programmable instructions 300 and 350, which may be JavaScript code, Hypertext Markup Language (HTML), Extensible Markup Language (XML), WebAssembly (Wasm), or the like, can be received from the organizer 214 and/or another participant node 212A-E. The programmable instructions 300 and 350 may be the programmable instructions 106 and/or the programmable instructions 218. The programmable instructions 300 and 350 are used by the media conferencing service 204 to combine various content, such as video streams received from the participant nodes 212A-E and third-party content, to create a composite video stream that is illustrated in the media conference interface 305 and 355.

As illustrated in FIG. 3A, the media conference interface 305 includes three virtual surfaces—a video display surface 310, a presenter surface 315, and a various content surface 320. The virtual surfaces 310, 315, 320 (or an abstract surfaces) are screen areas within which the media conferencing service 204 delegates rendering of various content that can be displayed with different size, shape, position, and/or other characteristics, which are defined by the programmable instructions 300. The programmable instructions 300 may provide each virtual surface 310, 315, 320 with a unique name and may include identifications of one or more display items, such as widgets (e.g., text, images, video, graphics, animations, input controls, etc.), to include in the virtual surface and one or more properties (e.g., size, position, color, visibility, etc.).

In the example illustrated in FIG. 3A, the media conference interface 305 includes the video display surface 310 that displays a video stream received from the organizer 214, another participant node 212A-E, and/or from a third-party. The position and size, as well as other characteristics such as color and visibility, of the video display surface 310 are defined by the programmable instructions 300. The presenter surface 315 displays a video stream of a headshot of a participant in the media conference, such as the organizer 214 or a participant node 212A-E. The position and size, as well as other characteristics such as color and visibility, of the presenter surface 315 are defined by the programmable instructions 300. Various content surface 320 includes a plurality of content items, such as widgets 331-336 including at least one of text, images, video, graphics, animations, input controls, etc. In one specific example, content items 331 and 334 could be images of different products, while content items 332 and 335 could include text that describes those products, and content items 333 and 336 could be customer ratings for the products. In another example, content items 331-336 could include different contents, such as text of a poll question and checkboxes corresponding to various different poll answers or other types of input relating to the video display or the presenter. For example, the poor question can relate to the performance of the presenter. The content items 331-336 can be received from a third-party source, such an online retailer.

As illustrated in FIG. 3B, the media conference interface 355 includes three virtual surfaces—a video display surface 360, a presenter surface 365, and a various content surface 370. The virtual surfaces 360, 365, 370 (or an abstract surfaces) are screen areas within which the media conferencing service 204 delegates rendering of various content that can be displayed with different size, shape, position, transparency, and/or other characteristics, which are defined by the programmable instructions 350. The programmable instructions 350 may provide each virtual surface 360, 365, 370 with a unique name and may include identifications of one or more display items, such as widgets (e.g., text, images, video, graphics, animations, input controls, etc.), to include in the virtual surface and one or more properties (e.g., size, position, color, visibility, etc.).

In the example illustrated in FIG. 3B, the media conference interface 355 has a smaller area than the media conference interface 305. For example, the media conference interface 355 may be specified for a mobile phone. The media conference interface 355 includes the video display surface 360 that displays a video stream received from the organizer 214, another participant node 212A-E, and/or from a third-party. The position and size, as well as other characteristics such as color and visibility, of the video display surface 310 are defined by the programmable instructions 350. The presenter surface 365 displays a video stream of a headshot of a participant in the media conference, such as the organizer 214 or a participant node 212A-E. The position and size, as well as other characteristics such as color and visibility, of the presenter surface 365 are defined by the programmable instructions 350. Various content surface 370 includes a plurality of content items, such as widgets 381-386 including at least one of text, images, video, graphics, animations, input controls, etc. The various content surface 370 is a rectangular interface that video display surface 360. Specifically, the upper portion of the various content surface 370 overlays the video display surface 360, while the lower portion of the various content surface 370 overlays other screen area below the video display surface 360. The programmable instructions 350 can define the percentage or amount of overlap (z-index), the transparency of the various content surface 370 in the region of overlap, or the like.

In one specific example, content items 381 and 384 could be images of different products, while content items 382 and 385 could include text that describes those products, and content items 383 and 386 could be customer ratings for the products. In another example, content items 381-386 could include different contents, such as text of a poll question and checkboxes corresponding to various different poll answers or other types of input relating to the video display or the presenter. For example, the poor question can relate to the performance of the presenter. The content items 381-386 can be received from a third-party source, such an online retailer.

Figure 4C:
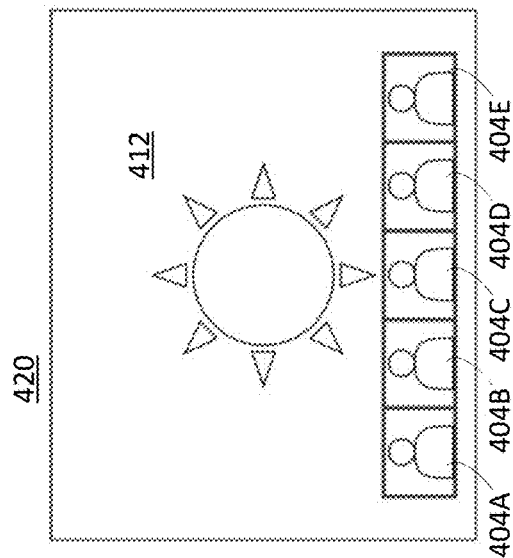
FIGS. 4A-D schematically illustrate various examples of preset layouts that can be provided by the media conferencing service.
Figure 4D:
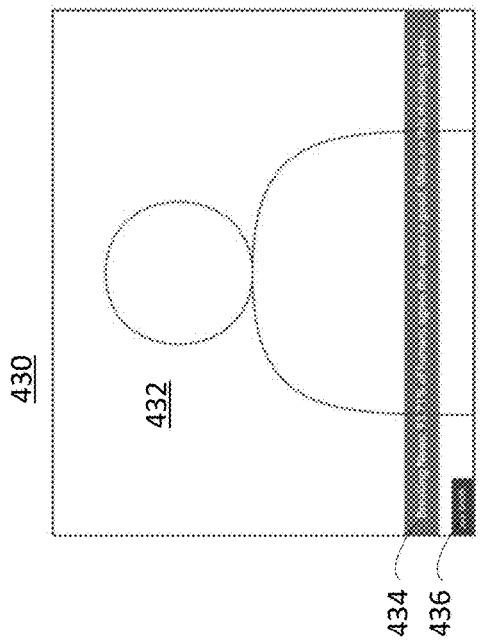
Figure 4A:
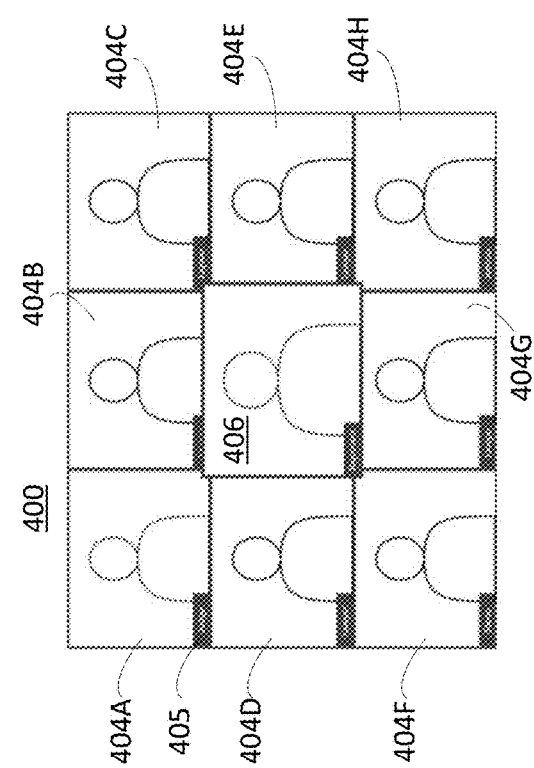

FIGS. 4A-D illustrate various examples of preset layouts that can be provided by the media conferencing service 204 for selection in the programmable instructions 106, 218, 300. FIG. 4A illustrates a group chat layout 400 that includes a plurality of tiles 404A-H and tile 406 aligned in a matrix. Each tile is associated with an individual participant in the media conference, such as the organizer 214 and a participant node 212A-E, and display a video feed of a headshot of the participant. Tiles 404A-H are equally sized and are distributed around the tile 406, which is relatively larger than each of tiles 404A-H to highlight the participant of tile 406. Tile 406 can be associated with an organizer of the media conference, such as the organizer 214, a presenter, or a current speaker. If tile 406 is associated with a current speaker, the participant associated with tile 406 may change repeatedly during the media conference. Each of the tiles 404A-H and tile 406 include an identifier 405 of the participant. The identifier 405 is overlaid on the video stream of the tiles 404A-H and tile 406. The identifier 405 of each participant may be a name of the participant or a title of the participant within an organization.

Figure 4B:
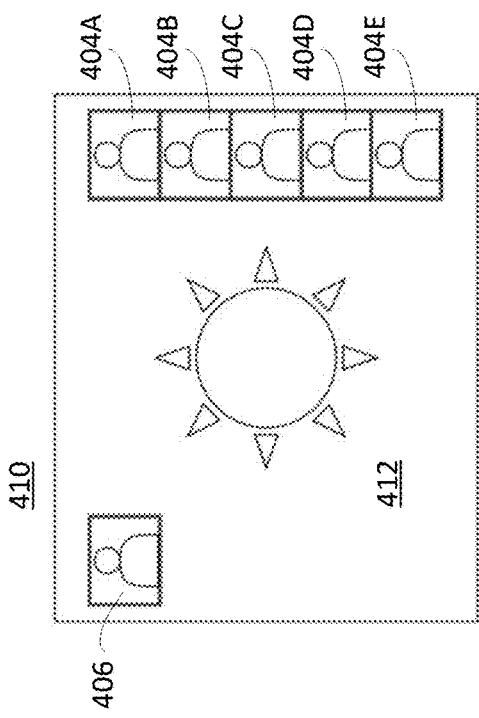

FIG. 4B illustrates a classroom layout 410 that includes tile 406, a plurality of tiles 404A-E, and content 412. Each tile 404A-E and 406 is associated with an individual participant in the media conference, such as the organizer 214 and a participant node 212A-E, and display a video feed of a headshot of the participant. Tile 406 can be associated with a teacher or professor that is lecturing to students that can be associated with tiles 404A-E. Tiles 404A-E are equally sized and are arranged along an axis to the right of the content 412. The tile 406 is illustrated as being the same size as each of tiles 404A-E. However, in some embodiments, the tile 406 can be larger or smaller than each of tiles 404A-E. As in the group chat layout 400, each of the tiles 404A-E and 406 can include an identifier of the participant. Content 412 can be a screen share of the user device associated with the teacher or processor or can be a presentation that is shared by the teacher or processor.

FIG. 4C illustrates a group review layout 420 that includes a plurality of tiles 404A-E and content 412. Each tile 404A-E is associated with an individual participant in the media conference, such as the organizer 214 and a participant node 212A-E, and display a video feed of a headshot of the participant. Tiles 404A-E are equally sized and are arranged along an axis to the bottom of the content 412. As in the group chat layout 400, each of the tiles 404A-E can include an identifier of the participant. Content 412 can be a screen share of the user device associated with a participant, content shared by a participant, or content received from a third-part source.

FIG. 4D illustrates a news layout 430 that includes a presenter surface 432, a text feed surface 434 overlaid near the bottom of the presenter surface 432, and an identifier 436 of the presenter overlaid at the bottom left corner of the presenter surface 432. The presenter surface 432 can display a video feed of a headshot of the presenter. The text feed 434 can scroll text from the organizer 214 or another participant node 212A-E, a third-party source, such as a social media network, an RSS feed, or the like.

The preset layouts 400, 410, 420, 430 can each be associated with code that is provided by the media conferencing service 204 and that is stored in the datastore 108, 208. One or more of the preset layouts 400, 410, 420, 430 can be selected to be included in the programmable instructions 106, 218, 300. As such, instead of providing code, an identifier of the preset layout 400, 410, 420, 430 can be provided, which can be used to retrieve associated code that is already stored in the datastore 108, 208.

Figure 5:
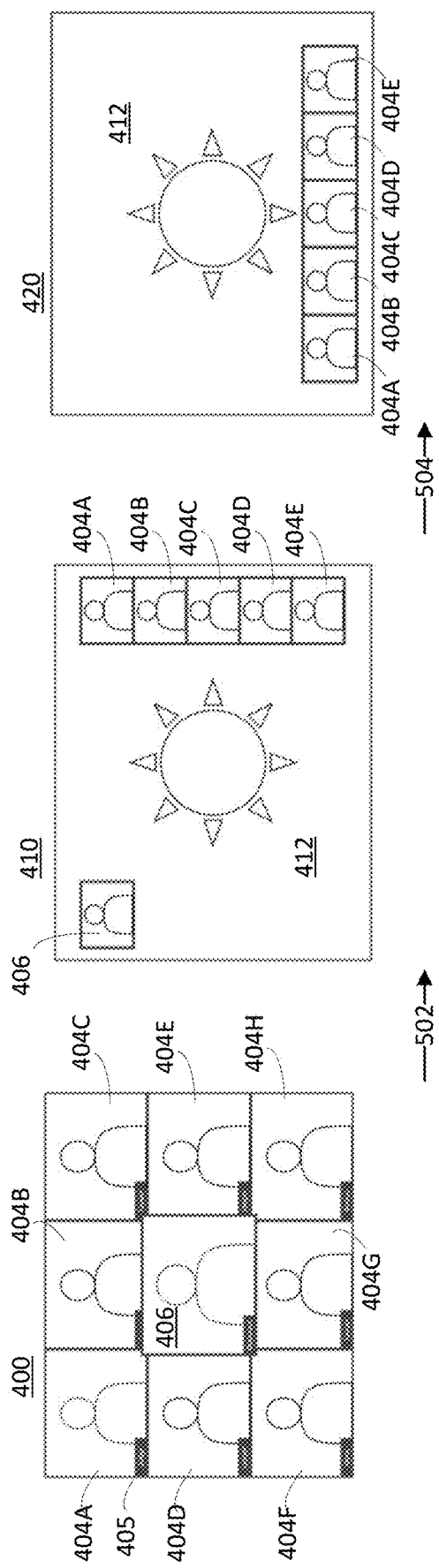
FIG. 5 schematically illustrates transitions between different layouts during a media conference.

FIG. 5 schematically illustrates various transitions between different layouts during a media conference. In one example illustrated in FIG. 5, the programmable instructions 106, 218, 300 can define two transition events—a first transition event 502 and a second transition event 504. In the example of FIG. 5, the programmable instructions 106, 218, 300 can initially cause the group chat layout 400 to be composited by the media conferencing service 204 at the start of the media conference. The first transition event 502 can detect when the presenter represented in the tile 406 in the group chat layout 400 starts to share or inject content 412, such as a presentation or a screenshare, into the media conference. Upon the detection of the sharing or injection of content 412, the programmable instructions 106, 218, 300 can automatically cause the group chat layout 400 to be replaced by the classroom layout 410 so that the a larger area is provided for the content 412. The classroom layout 410 can continue to be composited by the media conferencing service 204 until the second transition event 504 is detected.

The second transition event 504 can be based on an absolute time or an elapsed time relative to the start of the media conference or relative to the first transition event 502. For example, the second transition event 504 can be defined as thirty minutes from the first transition event 502 if the content 412 is scheduled for thirty minutes. In another example, the second transition event 504 can be defined as the bottom of the hour if the content 412 is scheduled to start at the top of the hour and is scheduled for thirty minutes. As such, while the first transition event 502 can be based on a change in the type of content being received by the media conferencing service 204 or be based on additional content being provided by a participant of the media conference to the media conferencing service 204, the second transition event 504 can be based on absolute or relative time. Upon the detection of the time, the programmable instructions 106, 218, 300 can automatically cause the classroom layout 410 to be replaced by the group review layout 420 so that each participant is equally represented to review the content 412 or to ask questions regarding the content 412. The group review layout 420 can continue, for example, to be composited by the media conferencing service 204 until the end of the media conference if no other transition events are defined by the programmable instructions 106, 218, 300.

In some embodiments, the first transition event 502 and the second transition event 504 can each be a state change, a change in video quality, a change in network quality, an action by a participant, an error state, or a content-based transition that is based on the content of the media.

Figure 6:
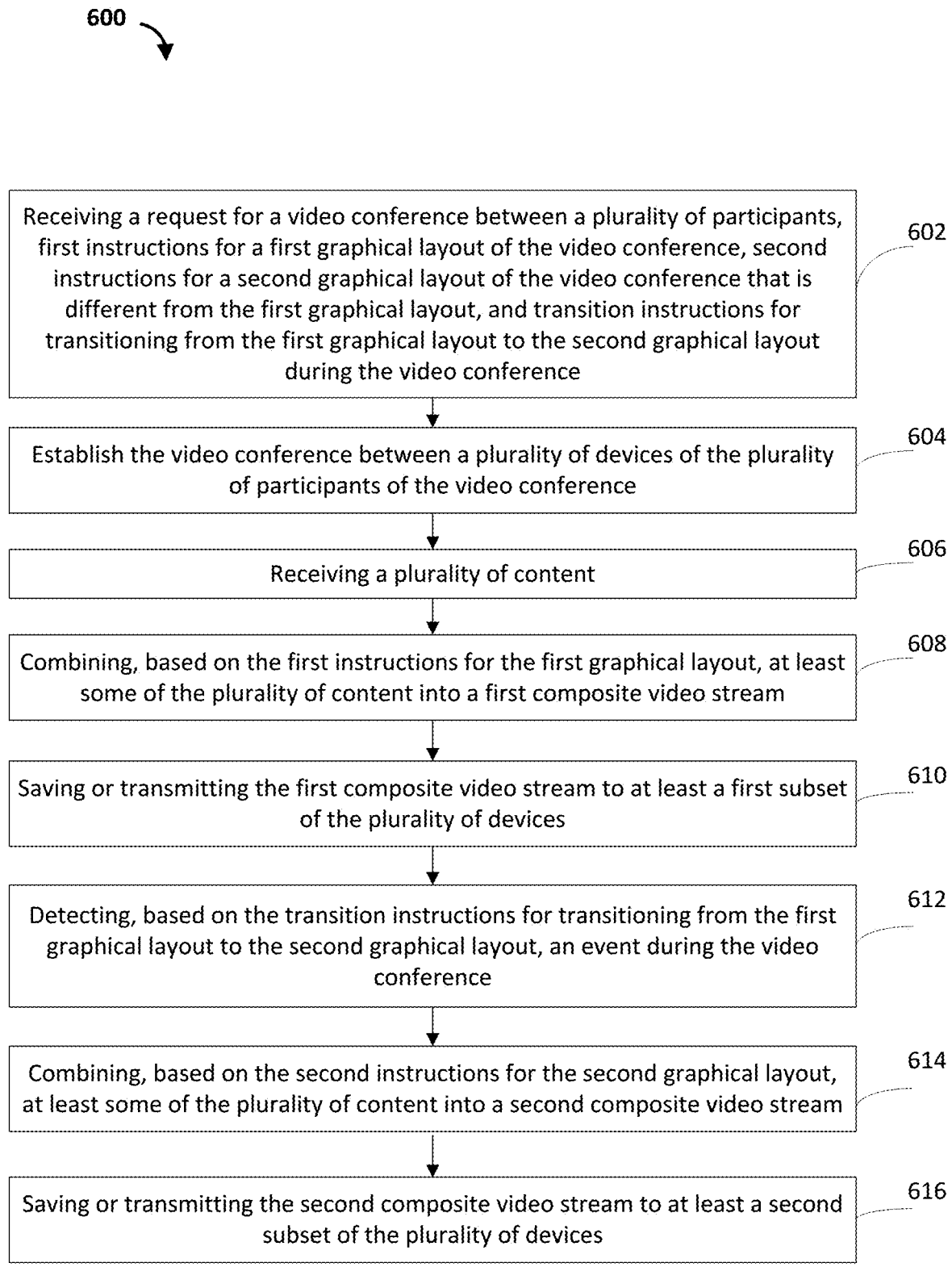
FIG. 6 is a flowchart showing an example process for combining content using instructions for a layout of the media conference using the media conferencing service.

FIG. 6 illustrates a flow diagram of an example method 600 that illustrates aspects of the functions performed at least partly by the service provider network 202. The example method 600 may be implemented to combining content using programmable instructions for one or more layouts during a media conference using the media conferencing service 204. The logical operations described herein with respect to FIG. 6 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 6, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At block 602, the media conferencing service 204 receives the request 216 for the media conference and the programmable instructions 106, 218, 300. The request 216 may include an identifier of the organizer 214, identifiers of the participant nodes 212A-E, a date, time, and/or duration for the video conference. The request 216 may also include an anticipated location for each participant node 212A-E. The participants, such as the organizer 214 and the participant nodes 212A-E, of the video conference may belong to the same organization or may belong to different organizations, such as different corporations. The programmable instructions 106, 218, 300 can be received from the organizer 214, an agent of an organization, and/or a participant nodes 212A-E. The programmable instructions 106, 218, 300 can include first instructions for a first graphical layout, second instructions for a second graphical layout that is different from the first graphical layout, and transition instructions for transitioning from the first graphical layout to the second graphical layout during the media conference. As explained above, the first instructions for a first graphical layout and the second instructions for a second graphical layout can be code specifying each layout can be an identifier of a preset layout that is provided by the media conferencing service 204, or both. As illustrated in the example of FIG. 5, the first graphical layout can be the group chat layout 400 and the second graphical layout can be the classroom layout 410. Following the example of FIG. 5, the transition between the group chat layout 400 and the classroom layout 410 can be based on injection of new content, such as the content 412, or can be based on absolute or relative time. In addition, the transition can be based on an activity of a participant node 212A-E. For example, if the teacher or processor becomes the current speaker, the programmable instructions 106, 218, 300 may instruct the media conferencing service 204 to transition the layout of the composite video from the group review layout 420 to the classroom layout 410. However, when a student becomes the current speaker, the programmable instructions 106, 218, 300 may instruct the media conferencing service 204 to transition the layout of the composite video from the classroom layout 410 to the group review layout 420.

Although only two graphical layouts and a single transition are explained with regard to block 602, it is understood that any number of graphical layouts and any number of transitions, including transitions to previously output graphical layouts, can be included in the programmable instructions 106, 218, 300 received at block 602. As described above, each of the graphical layouts can include one or more virtual surfaces that are each associated with different content. The size, position, and other characteristics of each virtual surface can be defined by the programmable instructions 106, 218, 300, as explained above.

At block 604, the media conferencing service 204 establishes a media conference, such as a video conference, in response to the request 216 from the organizer 214. The video conference can be established between the organizer 214 and one of more of the participant nodes 212A-E, or only between the participant nodes 212A-E, via the hosting servers 206.

At block 606, a plurality of content is received at the media conferencing service 204. Some of the content can be individual video streams and/or other content, such as a presentation or a gaming session, received from at least some of participant nodes 212A-E. In some embodiments, content can be received from some, but not all, of the participant nodes 212A-E, while in other embodiments, content, such as individual video streams, can be received from all of the participant nodes 212A-E. A video stream may be received from a camera of a user device capturing, for example, a headshot of the participant associated with the participant node 212A-E. Content can also be received from a third-party. For example, an image file, a video file, a video stream, a game stream, a webpage, an application graphical user interface, a video of a screen, a text feed, an RSS feed, augmented reality, virtual reality, spatial audio, multichannel audio, or the like, can be received from a third-party that is specified in the programmable instructions 106, 218, 300.

At block 608, the media conferencing service 204 may combine at least some of the content according the first instructions for the first graphical layout into a first composite video stream. The media conferencing service 204 can create the virtual surfaces for the first graphical layout defined by the programmable instructions 106, 218, 300 and insert the specified content into the corresponding virtual surface, as described in greater detail in connection with FIG. 3. The video processing system 210 may combine the plurality of individual content by setting an aspect ratio of the composite video stream to match that of the display of the participant node 212A-E receiving the first composite video stream, by setting a resolution of the first composite video stream to match that of the display of the participant node 212A-E receiving the first composite video stream, by setting a codec that can be decoded by the participant node 212A-E receiving the first composite video stream, by setting a frame rate of the first composite video stream to match that of the display of the participant node 212A-E receiving the first composite video stream, by setting a size of the first composite video stream to match that of the display of the participant node 212A-E receiving the first composite video stream, and/or by setting a color coordinate to match that of the display of the participant node 212A-E receiving the first composite video stream. In some embodiments, the first composite video stream can be processed to have a higher quality that the individual content making up the first composite video stream. For example, the individual content may be up-sampled to a higher resolution, the frame rate may be increased, color may be corrected, and lighting may be improved. In some embodiments, machine learning can be used to interpolate missing information in the received content.

With regard to the audio associated with the content being combined into the first composite video stream, the audio associated with each content item can be kept as a separate channel to enable transcription of the audio in real time during the media conference or following completion of the media conference. In some embodiments, all of the audio associated with the plurality of content items can be combined into a single channel at block 608.

At block 610, the media conferencing service 204 may save the first composite video stream or may transmit the first composite video stream to at least a first subset of user devices. The media conferencing service 204 may transmit the first composite video stream to at least the first subset of user devices by transmitting the first composite video stream to a broadcast service. In some embodiments, every user device or participant node 212A-E participating in the media conference may receive the first composite video stream. In some embodiments, a plurality of the user devices or participant nodes 212A-participating in the media conference may receive the first composite video stream while one or more user devices or participant nodes 212A-E participating in the media conference may not receive the first composite video stream. In some embodiments, the same first composite video stream may be sent to each of the first subset of user devices or participant nodes 212A-E participating in the media conference, while in other embodiments different versions of the first composite video stream may be sent to different user devices or participant nodes 212A-E participating in the media conference. The different versions of the first composite video stream may have different sizes, different resolutions, different frame rates, be encoded using a different codecs, or the like based on the programmable instructions 106, 218, 300. In some embodiments, the first composite video stream may be streamed to the first subset of user devices or participant nodes 212A-E using a protocol that supports bidirectional audio and video transmission, such as a Real-Time Messaging Protocol (RTMP), a Session Initiation Protocol (SIP), Real-Time Communications (RTC or WebRTC), or the like.

At block 612, a transition event can be detected during the video conference based on the transition instructions for transitioning from the first graphical layout to the second graphical layout included in the programmable instructions 106, 218, 300. The transition event can be at least one of a change in an activity of one of the participants, a change in the types of content that are received by the media conferencing service 204, an absolute time of day, or a relative time from the start of the media conference. The transition event can also be a state change, a change in video quality, a change in network quality, an action by a participant, an error state, or a content-based transition that is based on the content of the media. For example, the transition event can be the start of sharing of content in addition to a camera video stream by a participant node 212A-E, the reception of content from a third-party source, such as an online video-sharing platform, the passing of a time from the start of the media conference, or time of day. For example, if a presentation during a media conference is scheduled for twenty minutes, a transition event can be detected at twenty minutes from the start of the sharing of the presentation or the start of speaking by the presenter. In another example, the transition event can be defined as the bottom of the hour if a presentation is scheduled to start at the top of the hour and is scheduled for thirty minutes.

At block 614, the media conferencing service 204 may combine at least some of the content according the second instructions for the second graphical layout into a second composite video stream upon detection of the transition event. The content that is combined into the second composite video stream may be the same as or different from the content that is combined into the first composite video stream at block 608 based on programmable instructions 106, 218, 300. For example, if the second graphical layout is the group review layout 420, tile 406 associated with a presenter is not included in the content that is combined into the second composite video stream. The media conferencing service 204 can create the virtual surfaces for the second graphical layout defined by the programmable instructions 106, 218, 300 and insert the specified content into the corresponding virtual surface, as described in greater detail in connection with FIG. 3. The video processing system 210 may combine the plurality of individual content by setting an aspect ratio of the composite video stream to match that of the display of the participant node 212A-E receiving the second composite video stream, by setting a resolution of the second composite video stream to match that of the display of the participant node 212A-E receiving the second composite video stream, by setting a codec that can be decoded by the participant node 212A-E receiving the second composite video stream, by setting a frame rate of the second composite video stream to match that of the display of the participant node 212A-E receiving the second composite video stream, by setting a size of the second composite video stream to match that of the display of the participant node 212A-E receiving the second composite video stream, and/or by setting a color coordinate to match that of the display of the participant node 212A-E receiving the second composite video stream. In some embodiments, the second composite video stream can be processed to have a higher quality that the individual content making up the second composite video stream. For example, the individual content may be up-sampled to a higher resolution, the frame rate may be increased, color may be corrected, and lighting may be improved. In some embodiments, machine learning can be used to interpolate missing information in the received content.

With regard to the audio associated with the content being combined into the second composite video stream, the audio associated with each content item can be kept as a separate channel to enable transcription of the audio in real time during the media conference or following completion of the media conference. In some embodiments, all of the audio associated with the plurality of content items can be combined into a single channel at block 614.

At block 616, the media conferencing service 204 may save the second composite video stream or may transmit the second composite video stream to at least a second subset of user devices. The media conferencing service 204 may transmit the second composite video stream to at least the second subset of user devices by transmitting the second composite video stream to a broadcast service. The second subset of user devices can be the same as or different from the first subset of user devices at block 612. In some embodiments, every user device or participant node 212A-E participating in the media conference may receive the second composite video stream. In some embodiments, a plurality of the user devices or participant nodes 212A-participating in the media conference may receive the second composite video stream while one or more user devices or participant nodes 212A-E participating in the media conference may not receive the second composite video stream. In some embodiments, the same second composite video stream may be sent to each of the second subset of user devices or participant nodes 212A-E participating in the media conference, while in other embodiments different versions of the second composite video stream may be sent to different user devices or participant nodes 212A-E participating in the media conference. The different versions of the second composite video stream may have different sizes, different resolutions, different frame rates, be encoded using a different codecs, or the like based on the programmable instructions 106, 218, 300. The encoding parameters of the second composite video stream may be the same as or different from the first composite video stream. In some embodiments, the second composite video stream may be streamed to the second subset of user devices or participant nodes 212A-E using a protocol that supports bidirectional audio and video transmission, such as a Real-Time Messaging Protocol (RTMP), a Session Initiation Protocol (SIP), Real-Time Communications (RTC or WebRTC), or the like.

Figure 7:
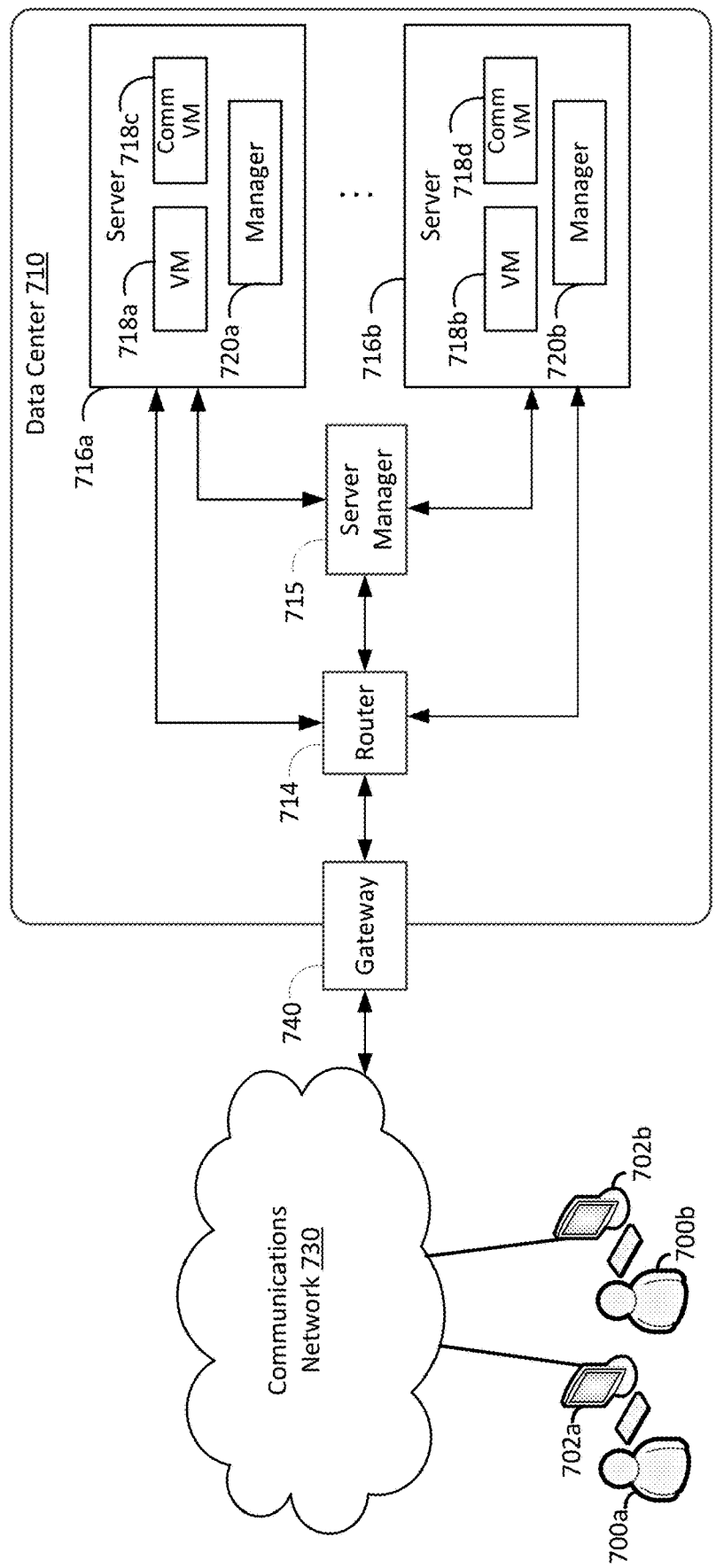
FIG. 7 is a diagram illustrating an example computing environment that may be used in some embodiments.

FIG. 7 illustrates an example computing environment in which the embodiments described herein may be implemented. The example computing environment of FIG. 7 may be configured to implement one or more of the services, such as the communications services 102, the video processing system 110, or a combination thereof of FIG. 1. The example computing environment of FIG. 7 may be configured to implement the media conferencing service 204 of FIG. 2. The example computing environment of FIG. 7 may be configured to implement any of the methods described herein, such as any methods (e.g., or any operations) associated with FIG. 6

FIG. 7 is a diagram schematically illustrating an example of a data center 710 that can provide computing resources to users 700a and 700b (which may be referred herein singularly as user 700 or in the plural as users 700) via user computers 702a and 702b (which may be referred herein singularly as computer 702 or in the plural as computers 702) via a communications network 730. Data center 710 may be configured to provide computing resources for executing applications on a permanent or an as-needed basis. The computing resources provided by data center 710 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 710 may include servers 716a-b (which may be referred herein singularly as server 716 or in the plural as servers 716) that provide computing resources. These resources may be available as bare metal resources, or as virtual machine instances 718a-d and (which may be referred herein singularly as virtual machine instance 718 or in the plural as virtual machine instances 718). Virtual machine instances 718c and 718d can be communication service virtual machine. The communication service virtual machine instances 718c and 718d may be configured to perform all or any portion of the communication services (e.g., contact center services, virtual environment services, determining virtual features, facilitating communication sessions, content services for accessing virtual environments) in accordance with the present disclosure and described in detail herein. As should be appreciated, while the particular example illustrated in FIG. 7 includes one communication service virtual machine in each server, this is merely an example. A server may include more than one communication service virtual machine or may not include any communication service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 7, communications network 730 may, for example, be a publicly accessible network of linked networks and possibly operated by various distinct parties, such as the Internet. In other embodiments, communications network 730 may be a private network, such as, a corporate or university network that is wholly or partially inaccessible to non-privileged users. In still other embodiments, communications network 730 may include one or more private networks with access to and/or from the Internet.

Communication network 730 may provide access to computers 702. User computers 702 may be computers utilized by users 700 or other customers of data center 710. For instance, user computer 702a or 702b may be a server, a desktop or laptop personal computer, a tablet computer, a wireless telephone, a personal digital assistant (PDA), an e-book reader, a game console, a set-top box or any other computing device capable of accessing data center 710. User computer 702a or 702b may connect directly to the Internet (e.g., via a cable modem or a Digital Subscriber Line (DSL)). Although only two user computers 702a and 702b are depicted, it should be appreciated that there may be multiple user computers.

User computers 702 may also be utilized to configure aspects of the computing resources provided by data center 710. In this regard, data center 710 might provide a gateway or web interface through which aspects of its operation may be configured through the use of a web browser application program executing on user computer 702. Alternately, a stand-alone application program executing on user computer 702 might access an application programming interface (API) exposed by data center 710 for performing the configuration operations. Other mechanisms for configuring the operation of various web services available at data center 710 might also be utilized.

Servers 716 shown in FIG. 7 may be standard servers configured appropriately for providing the computing resources described above and may provide computing resources for executing one or more web services and/or applications. In one embodiment, the computing resources may be virtual machine instances 718. In the example of virtual machine instances, each of the servers 716 may be configured to execute an instance manager 720a or 720b (which may be referred herein singularly as instance manager 720 or in the plural as instance managers 720) capable of executing the virtual machine instances 718. The instance managers 720 may be a virtual machine monitor (VMM) or another type of program configured to enable the execution of virtual machine instances 718 on server 716, for example.

As discussed above, each of the virtual machine instances 718 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 710 shown in FIG. 7, a router 714 may be utilized to interconnect the servers 716a and 716b. Router 714 may also be connected to gateway 740, which is connected to communications network 730. Router 714 may be connected to one or more load balancers, and alone or in combination may manage communications within networks in data center 710, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 710 shown in FIG. 7, a server manager 715 is also employed to at least in part direct various communications to, from and/or between servers 716a and 716b. While FIG. 7 depicts router 714 positioned between gateway 740 and server manager 715, this is merely an exemplary configuration. In some cases, for example, server manager 715 may be positioned between gateway 740 and router 714. Server manager 715 may, in some cases, examine portions of incoming communications from user computers 702 to determine one or more appropriate servers 716 to receive and/or process the incoming communications. Server manager 715 may determine appropriate servers to receive and/or process the incoming communications based on factors such as an identity, location or other attributes associated with user computers 702, a nature of a task with which the communications are associated, a priority of a task with which the communications are associated, a duration of a task with which the communications are associated, a size and/or estimated resource usage of a task with which the communications are associated and many other factors. Server manager 715 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 710 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, videogame consoles, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
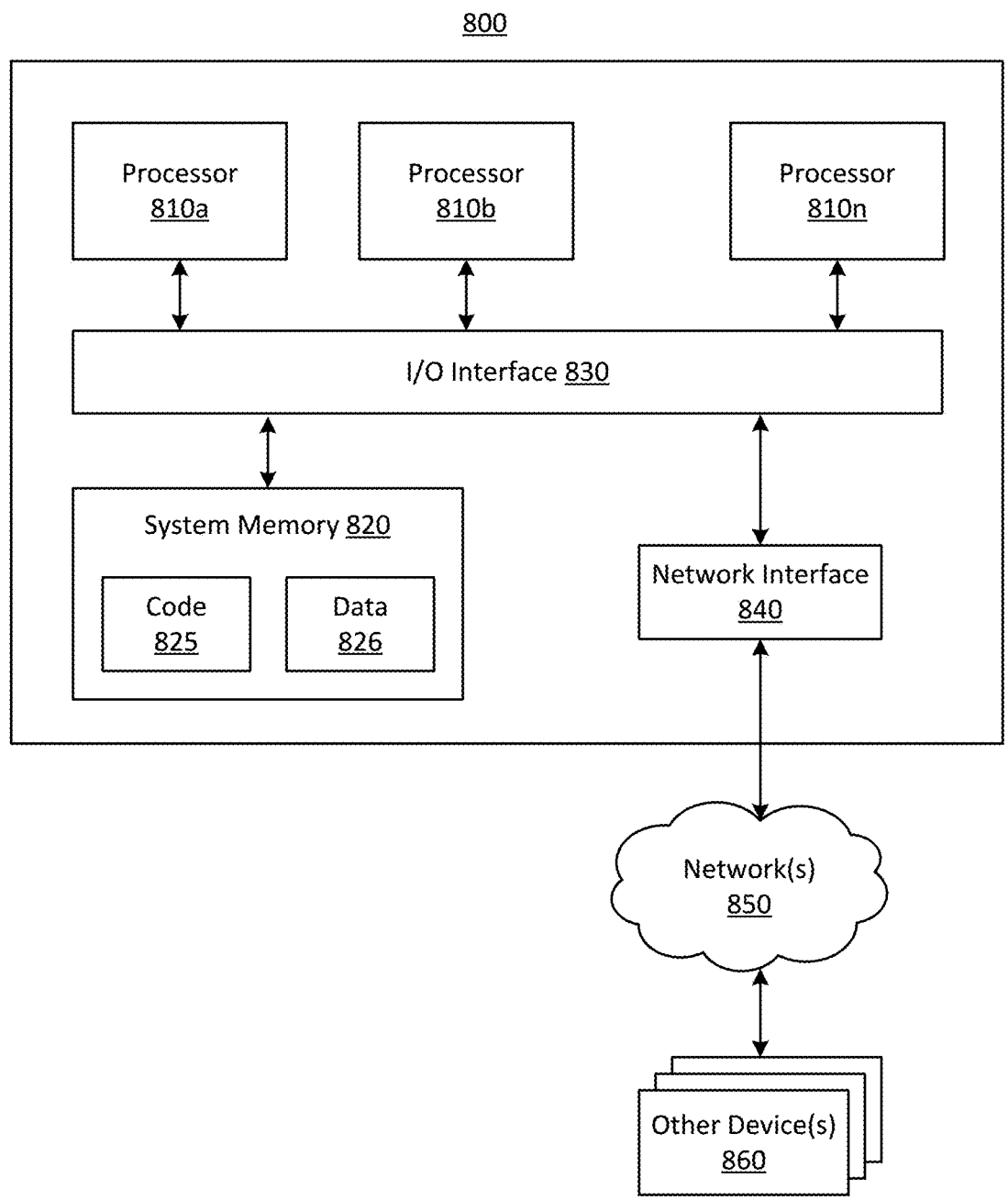
FIG. 8 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. The example computer system of FIG. 8 may be configured to implement the servers 100, the communications services 102, the user devices 104, the video processing system 110, or a combination thereof of FIG. 1. The example computer system of FIG. 8 may be configured to implement the media conferencing service 204 of FIG. 2, the organizer 214, the participant nodes 212A-E, or a combination thereof of FIG. 2. The example computer system of FIG. 8 may be configured to implement any of the methods described herein, such as any methods (e.g., or any operations) associated with FIG. 6.

In the illustrated embodiment, computing system 800 includes one or more processors 810a, 810b and/or 810n (which may be referred herein singularly as "a processor 810" or in the plural as "the processors 810") coupled to a system memory 820 via an input/output (I/O) interface 830. Computing system 800 further includes a network interface 840 coupled to I/O interface 830.

In various embodiments, the computing system 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 820 as code 825 and data 826.

In an embodiment, I/O interface 830 may be configured to coordinate I/O traffic between processor 810, system memory 820 and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing system 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 820 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing system 800 via I/O interface 830. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing system 800 as system memory 820 or another type of memory. Further, a computer-accessible medium may include transmission media or signals such as electrical, electromagnetic or digital signals conveyed via a communication medium such as a network and/or a wireless link, such as those that may be implemented via network interface 840. Portions or all of multiple computing devices such as those illustrated in FIG. 8 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing system," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method comprising:
   receiving a request for a video conference between a plurality of participants, first instructions for a first graphical layout of the video conference, second instructions for a second graphical layout of the video conference, and transition instructions for transitioning from the first graphical layout to the second graphical layout in response to an event during the video conference;
   receiving, from a plurality of devices of the plurality of participants of the video conference, a plurality of content;
   combining, based on the first instructions, a first group of the plurality of content into a first composite video stream, the first group of the plurality of content being positioned relative to one another according to the first graphical layout;
   transmitting the first composite video stream to at least a first subset of the plurality of devices;
   detecting, based on the transition instructions, the event during the video conference;
   combining, in response to the event during the video conference and based on the second instructions, a second group of the plurality of content into a second composite video stream, the relative positions of the second group of the plurality of content being different according to the second graphical layout than the first graphical layout; and
   transmitting the second composite video stream to at least a second subset of the plurality of devices.

2. The method of claim 1, wherein receiving the first instructions for the first graphical layout of the video conference and the second instructions for the second graphical layout of the video conference comprises receiving code specifying first graphical layout parameters and second graphical layout parameters.

3. The method of claim 1, wherein receiving the first instructions for the first graphical layout of the video conference and the second instructions for the second graphical layout of the video conference comprises receiving a first selection of a first preset graphical layout and a second selection of a second preset graphical layout.

4. The method of claim 1, wherein receiving the first instructions for the first graphical layout of the video conference and the second instructions for the second graphical layout of the video conference comprises receiving code specifying first graphical layout parameters and a selection of a second preset graphical layout.

5. The method of claim 1, wherein receiving the first instructions for the first graphical layout of the video conference and the second instructions for the second graphical layout of the video conference comprises receiving a selection of a first preset graphical layout and code specifying second graphical layout parameters.

6. The method of claim 1, wherein:
   the event is at least one of a time, a change in an activity of one of the plurality of participants, or a change in the types of content that are received, and
   the time is at least one of a time of day or a relative time from the start of the video conference.

7. The method of claim 1, wherein combining the first group of the content into the first composite video stream and the second group of the content into the second composite video stream is further based on encoding instructions specifying at least one of a size, a resolution, a frame rate, or an encoding standard for the first composite video stream and the second composite video stream.

8. The method of claim 1, wherein the event is reception of additional content from at least one of the plurality of devices of the plurality of participants of the video conference.

9. The method of claim 1, wherein the first group of the content and the second group of the content are different.

10. The method of claim 1, further comprising receiving second transition instructions for transitioning from the second graphical layout to a third graphical layout in response to a second event during the video conference, the relative positions of the at least some of the plurality of content being different according to the third graphical layout than the second graphical layout.

11. The method of claim 1, wherein the plurality of content is received after the request for the video conference, the first instructions, the second instructions, and the transition instructions.

12. A media conferencing service comprising:
a computing node and a non-transitory computer-readable medium, the computer-readable medium having stored therein computer-readable instructions that, upon execution by the computing node, configure the media conferencing service to perform operations comprising:
establishing a video conference between a plurality of devices of participants of the video conference;
receiving first content from a device of the plurality of devices in the established video conference;
receiving second content;
receiving first instructions for a first layout of the first content and the second content during the video conference, second instructions for a second layout of the first content and the second content during the video conference, and transition instructions for transitioning from the first layout to the second layout in response to an event during the video conference;
combining, based on the first instructions, the first content and the second content into a first composite video stream, the first content and the second content being positioned relative to one another according to the first layout;
detecting, based on the transition instructions, the event during the video conference; and
combining, in response to the event during the video conference and based on the second instructions, the first content and the second content into a second composite video stream, the relative position of the first content and the second content being different according to the second layout than the first layout.

13. The media conferencing service of claim 12, wherein the computer-readable instructions upon execution further configure the media conferencing service to perform operations comprising transmitting the first composite video stream and the second composite video stream to at least one of the plurality of devices or to a broadcast service.

14. The media conferencing service of claim 12, wherein the computer-readable instructions upon execution configure the media conferencing service to receive the first instructions for the first layout of the first content and the second content during the video conference by presenting, to an organizer of the video conference, a graphical user interface to select layout parameters.

15. The media conferencing service of claim 12, wherein the computer-readable instructions upon execution configure the media conferencing service to receive the first instructions for the first layout of the first content and the second content during the video conference by receiving code specifying layout parameters.

16. The media conferencing service of claim 15, wherein the layout parameters comprise at least one of a position, a size, a z-index, an arrangement, overlapping, a resolution, or a frame rate for each of the first content and the second content.

17. The media conferencing service of claim 12, wherein the computer-readable instructions upon execution configure the media conferencing service to receive the first instructions for the first layout of the first content and the second content during the video conference by receiving a selection of a preset layout specifying layout parameters.

18. The media conferencing service of claim 12, wherein the event is at least one of a change in an activity of one of the participants or a change in the types of content that are received by the media conferencing service.

19. The media conferencing service of claim 12, wherein the event is at least one of a time of day or a relative time from the start of the video conference.

20. The media conferencing service of claim 12, wherein each of the first content and the second content are at least one of video of a headshot of a participant of the video conference, an image of a headshot of a participant of the video conference, an image file, a video file, a video stream, a game stream, a presentation, a webpage, an application graphical user interface, a video of a screen, a text feed, an RSS feed, augmented reality, virtual reality, spatial audio, or multichannel audio.

21. A non-transitory computer-readable storage medium having stored thereon computer-readable instructions, the computer-readable instructions comprising instructions that, upon execution on one or more computing devices, at least cause:
establishing a video conference between a plurality of devices of participants of the video conference;
receiving first content from a device of the plurality of devices in the established video conference;
receiving second content;
receiving first instructions for a first layout of the first content and the second content during the video conference, second instructions for a second layout of the first content and the second content during the video conference, and transition instructions for transitioning from the first layout to the second layout in response to an event during the video conference;
combining, based on the first instructions, the first content and the second content into a first composite video stream, the first content and the second content being positioned relative to one another according to the first layout;
detecting, based on the transition instructions, the event during the video conference; and
combining, in response to the event during the video conference and based on the second instructions, the first content and the second content into a second composite video stream, the relative position of the first content and the second content being different according to the second layout than the first layout.

22. The computer-readable storage medium of claim 21, wherein the computer-readable instructions upon execution further cause:

saving the first composite video stream and the second composite video stream, transmitting the first composite video stream and the second composite video stream to at least one of the plurality of devices, or transmitting the first composite video stream and the second composite video stream to a broadcast service.

\* \* \* \* \*